US012803861B2

(12) United States Patent
Mori

(10) Patent No.: US 12,803,861 B2
(45) Date of Patent: Nov. 17, 2026

(54) COMMUNICATION DEVICE CONFIGURED TO TRANSMIT LOG TO EXTERNAL DEVICE, NON-TRANSITORY COMPUTER-READABLE RECORDING MEDIUM STORING COMPUTER-READABLE INSTRUCTIONS FOR COMMUNICATION DEVICE, AND CONTROL METHOD FOR THIS COMMUNICATION DEVICE

(71) Applicant: BROTHER KOGYO KABUSHIKI KAISHA, Nagoya (JP)

(72) Inventor: Kyohei Mori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/364,061

(22) Filed: Aug. 2, 2023

(65) Prior Publication Data

US 2024/0048435 A1 Feb. 8, 2024

(30) Foreign Application Priority Data

Aug. 5, 2022 (JP) ................................ 2022-125763

(51) Int. Cl.
*H04L 41/0604* (2022.01)
*G06F 3/12* (2006.01)
(Continued)

(52) U.S. Cl.
CPC ........ *H04L 41/0604* (2013.01); *G06F 3/1239* (2013.01); *G06F 3/1259* (2013.01);
(Continued)

(58) Field of Classification Search
CPC ..... H04L 41/0604; H04L 43/04; H04L 67/02; H04L 67/535; H04L 67/60;
(Continued)

(56) References Cited

U.S. PATENT DOCUMENTS 6,202,092 B1 * 3/2001 Takimoto ................ G06F 21/84 358/1.15
7,440,961 B1 * 10/2008 Matousek ............... G06F 16/21
(Continued)

FOREIGN PATENT DOCUMENTS

JP 2003091434 A 3/2003
JP 2008052679 A * 3/2008
(Continued)

OTHER PUBLICATIONS

Industrial Property Cooperation Center, "JP 2022125763 Search Report by Registered Search Organization", Mar. 11, 2026, Translated (Year: 2026).*
(Continued)

*Primary Examiner* — Ramy M Osman
(74) *Attorney, Agent, or Firm* — Scully, Scott, Murphy & Presser, P. C.

(57) ABSTRACT

A communication device may include: a communication interface for communication with a server on the Internet; a memory storing log information that indicates a list of logs of events occurring in the communication device; and a controller. The controller may be configured to: execute a predetermined communication with a specific server on the Internet via the communication interface; and execute a transmitting process for transmitting, to an external device different from the communication device, a log included in the log information stored in the memory, wherein in the transmitting process, a first-type log indicating a log of a first-type event is transmitted to the external device, in the transmitting process, a second-type log indicating a log of a second-type event is not transmitted to the external device, and the second-type event is the predetermined communication that is repeatedly executed.

5 Claims, 7 Drawing Sheets

Figure 1:
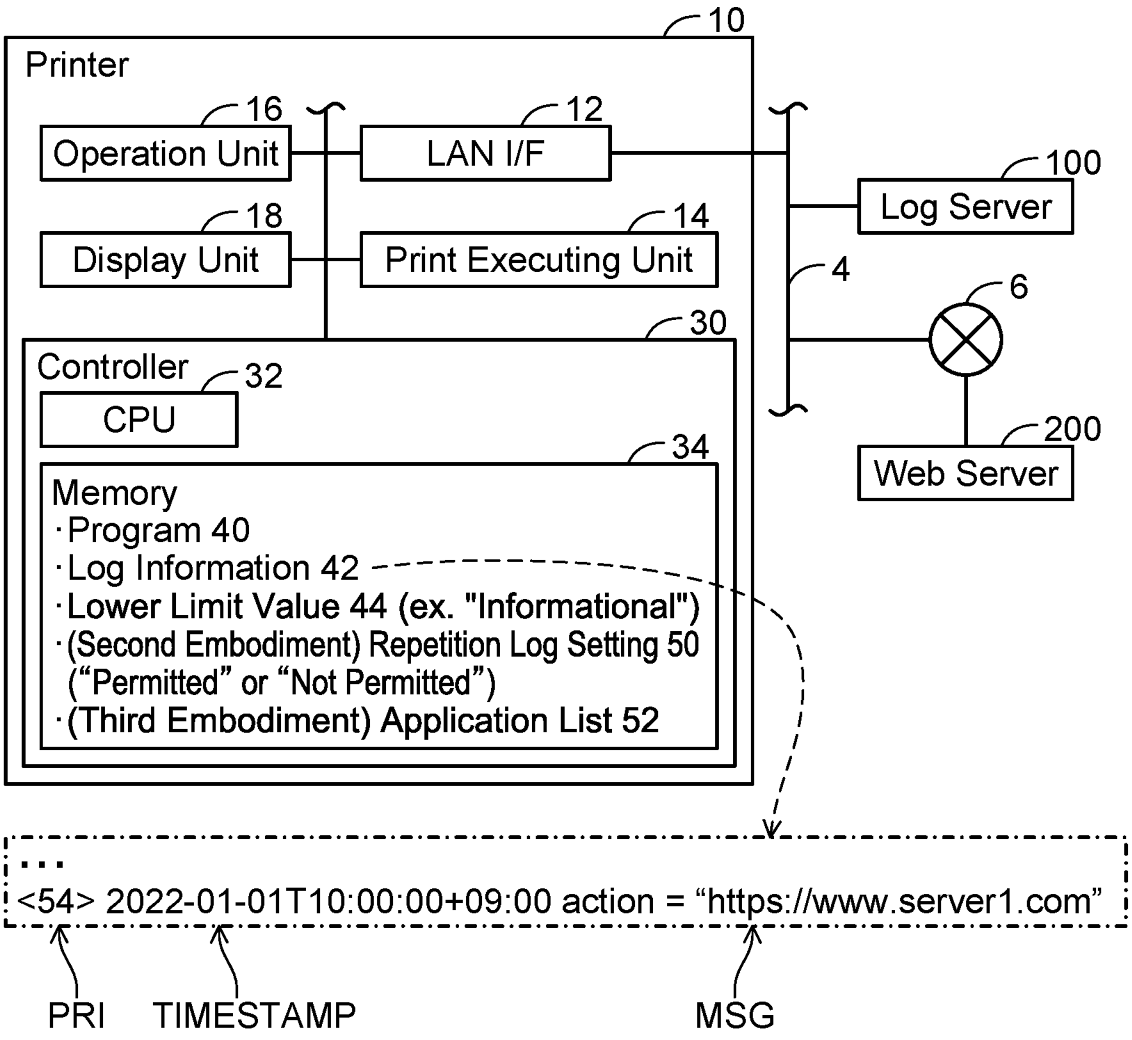

(51) Int. Cl.

| | |
|---|---|
| ***G06F 11/34*** | (2006.01) |
| ***H04L 43/04*** | (2022.01) |
| ***H04L 67/02*** | (2022.01) |
| ***H04L 67/50*** | (2022.01) |
| ***H04L 67/60*** | (2022.01) |

(52) U.S. Cl.

CPC ........ *G06F 3/1273* (2013.01); *G06F 11/3476* (2013.01); *H04L 43/04* (2013.01); *H04L 67/02* (2013.01); *H04L 67/535* (2022.05); *H04L 67/60* (2022.05)

(58) Field of Classification Search

CPC . H04L 41/0609; H04L 41/069; G06F 3/1273; G06F 3/1204; G06F 3/1207; G06F 3/1239; G06F 3/1259; G06F 3/1288; G06F 11/3476

See application file for complete search history.

(56) References Cited

U.S. PATENT DOCUMENTS

| | | | | |
|---|---|---|---|---|
| 8,886,664 | B2 * | 11/2014 | Dolin | G06Q 50/01 707/769 |
| 9,569,290 | B1 * | 2/2017 | Osipov | G06F 1/3234 |
| 9,781,053 | B1 * | 10/2017 | Allen | G06F 9/5027 |
| 9,946,621 | B2 * | 4/2018 | Collins | G06F 11/3006 |
| 10,366,055 | B2 * | 7/2019 | Dolin | H04L 67/535 |
| 10,521,584 | B1 * | 12/2019 | Sharifi Mehr | H04L 63/1433 |
| 10,545,872 | B2 * | 1/2020 | Brizio | G06F 12/0857 |
| 10,643,234 | B1 * | 5/2020 | Dennis | G06Q 30/0246 |
| 11,190,421 | B1 * | 11/2021 | Liu | H04L 41/0604 |
| 11,595,249 | B2 * | 2/2023 | Bharde | H04L 41/069 |
| 11,977,800 | B2 * | 5/2024 | Okayama | G06F 3/1203 |
| 2003/0182368 | A1 * | 9/2003 | Horiyama | G06F 3/1204 358/1.15 |
| 2004/0028059 | A1 * | 2/2004 | Josyula | H04Q 3/0087 370/396 |
| 2006/0085689 | A1 * | 4/2006 | Bjorsne | G06F 11/0748 714/39 |
| 2007/0266237 | A1 * | 11/2007 | Kuroki | G06Q 30/04 713/156 |
| 2008/0045277 | A1 * | 2/2008 | Plestid | H04W 52/0251 455/343.1 |
| 2009/0012748 | A1 * | 1/2009 | Beish | G06F 11/3636 702/187 |
| 2010/0082530 | A1 * | 4/2010 | Miyamoto | G06F 16/24556 707/E17.005 |
| 2012/0215907 | A1 * | 8/2012 | Chung | G06F 21/554 709/224 |
| 2012/0260251 | A1 * | 10/2012 | Collins | G06F 11/3072 718/100 |
| 2017/0302553 | A1 * | 10/2017 | Zafer | H04L 41/142 |
| 2019/0005531 | A1 * | 1/2019 | Hatakeyama | G06Q 30/0226 |
| 2019/0368851 | A1 * | 12/2019 | Choi | F42D 3/04 |
| 2020/0258013 | A1 * | 8/2020 | Monnett | H04L 41/5074 |
| 2021/0406106 | A1 * | 12/2021 | Moss | G06F 11/0706 |
| 2021/0409264 | A1 * | 12/2021 | Bharde | H04L 41/069 |
| 2023/0251807 | A1 * | 8/2023 | Okayama | G06F 3/1287 358/1.15 |
| 2023/0333962 | A1 * | 10/2023 | Wannamaker | G06F 11/3604 |
| 2024/0048435 | A1 * | 2/2024 | Mori | H04L 67/60 |
| 2025/0065830 | A1 * | 2/2025 | Reed | B60R 16/0231 |

FOREIGN PATENT DOCUMENTS

| | | | | |
|---|---|---|---|---|
| JP | 2013061778 A | * | 4/2013 | G06F 3/1273 |
| JP | 2016040732 A | | 3/2016 | |
| JP | 2020086666 A | * | 6/2020 | |
| JP | 2020154690 A | | 9/2020 | |

OTHER PUBLICATIONS

Examiner Imagawa et al., "JP 2022125763 Notice of Reasons for Refusal", Mar. 11, 26, Office of Credit Information Processing, Translated (Year: 2026).*

* cited by examiner (First Embodiment)

(Second Embodiment)

(Third Embodiment)

(Third Embodiment: Specific Case)

COMMUNICATION DEVICE CONFIGURED TO TRANSMIT LOG TO EXTERNAL DEVICE, NON-TRANSITORY COMPUTER-READABLE RECORDING MEDIUM STORING COMPUTER-READABLE INSTRUCTIONS FOR COMMUNICATION DEVICE, AND CONTROL METHOD FOR THIS COMMUNICATION DEVICE

REFERENCE TO RELATED APPLICATION

This application claims priority from Japanese Patent Application No. 2022-125763 filed on Aug. 5, 2022. The entire content of the priority application is incorporated herein by reference.

BACKGROUND ART

A technique is known for transmitting log information that indicates logs of events that have occurred in a communication device to a server.

DESCRIPTION

Events occurring in a communication device can include a communication with a server on the Internet. The communication with a server on the Internet can occur repeatedly over a short period of time. The disclosure herein provides a technique for transmitting logs to an external device, taking into account the situation where a predetermined communication is repeatedly executed with a specific server on the Internet.

A communication device disclosed herein may comprise a communication interface for communication with a server on the Internet; a memory storing log information that indicates a list of logs of events occurring in the communication device; and a controller. The controller may be configured to: execute a predetermined communication with a specific server on the Internet via the communication interface; and execute a transmitting process for transmitting, to an external device different from the communication device, a log included in the log information stored in the memory, wherein in the transmitting process, a first-type log indicating a log of a first-type event is sent to the external device, in the transmitting process, a second-type log indicating a log of a second-type event is not sent to the external device, and the second-type event is the predetermined communication that is repeatedly executed.

Since the predetermined communication, which is the second-type event, occurs repeatedly, the number of occurrences of the second-type event is greater than the number of occurrences of the first-type event. Logs are analyzed and displayed at the external device. If the second-type logs are sent to the external device, the load on the external device, which analyzes the logs, will be increased due to the large number of second-type logs. Also, if the second-type logs are sent to the external device, the small number of first-type logs may blend in among the display of many second-type logs, and a user may not notice the occurrences of the first-type events.

According to the above configuration, the first-type log is sent to the external device, while the second-type log is not sent to the external device. It is possible to suppress the increased load on the external device, which analyzes the logs, caused by the influence of a large number of second-type logs. It is also possible to prevent a small number of first-type logs from blending in the display of a large number of second-type logs. As above, it is possible to transmit logs to the external device, taking into account the situation where the predetermined communication is repeatedly executed with the specific server on the Internet.

A control method for implementing the above communication device, a computer program for the above communication device, and a computer-readable recording medium storing the computer program are also novel and useful.

Figure 2:
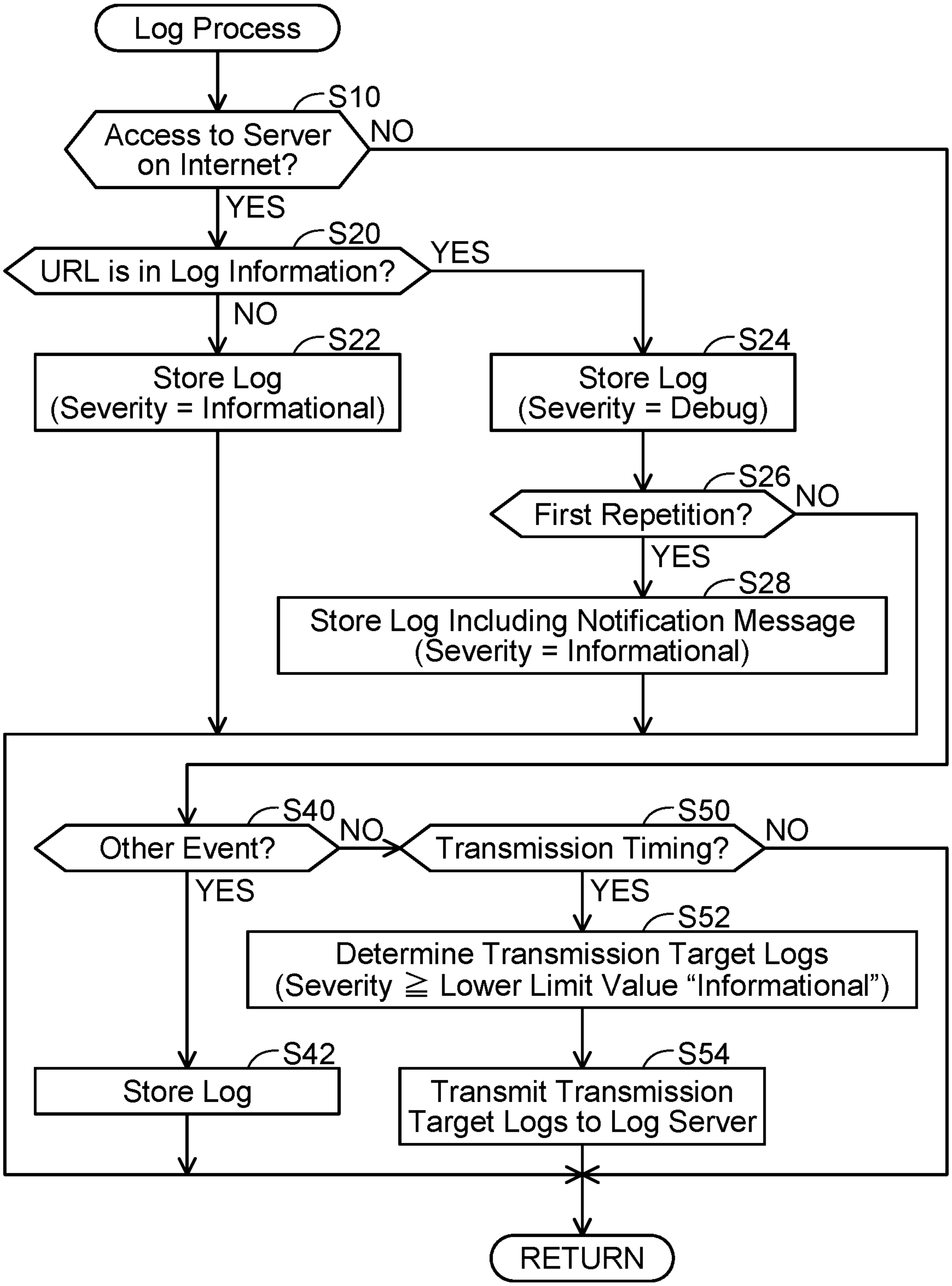
Figure 3:
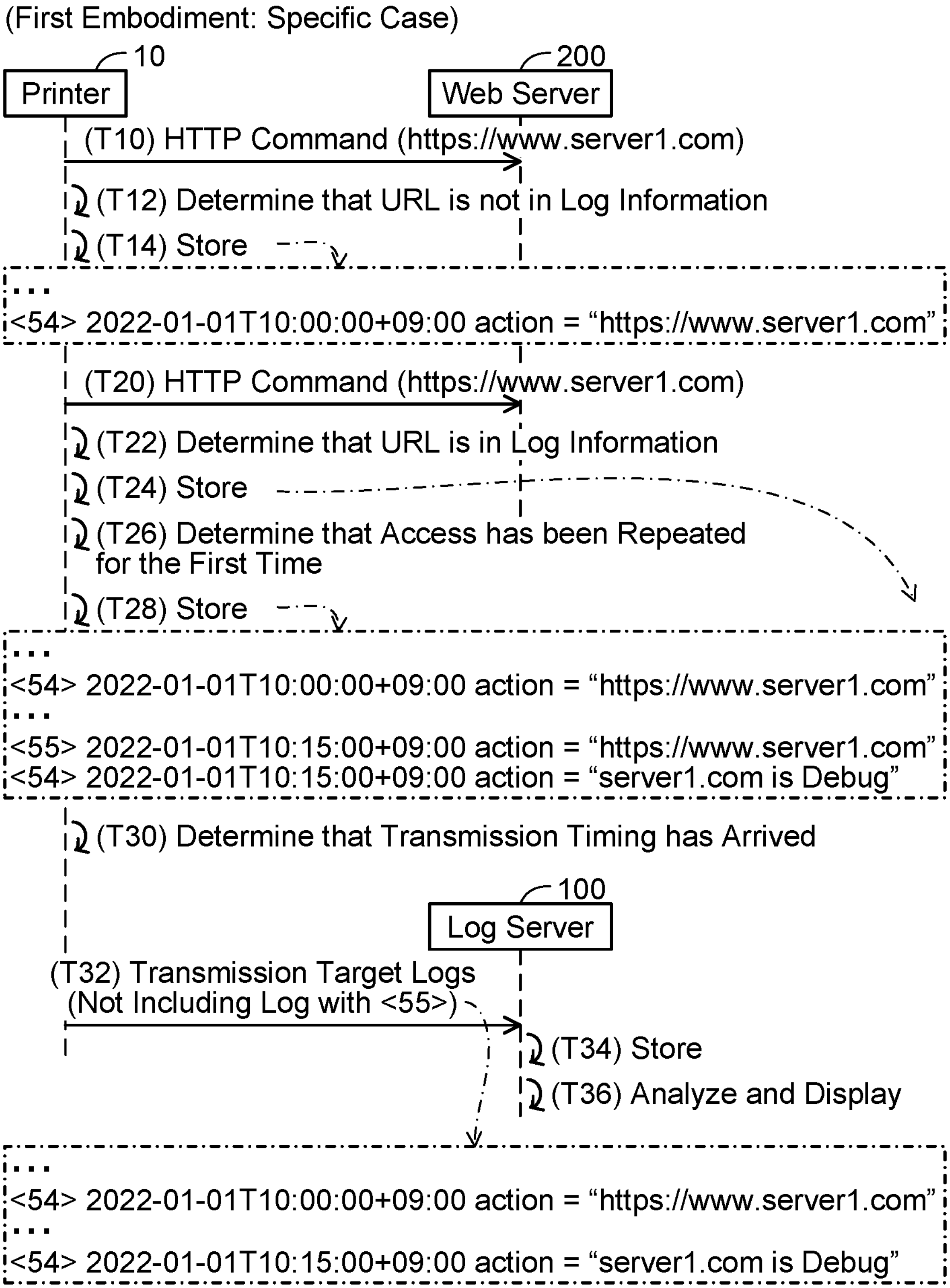
Figure 4:
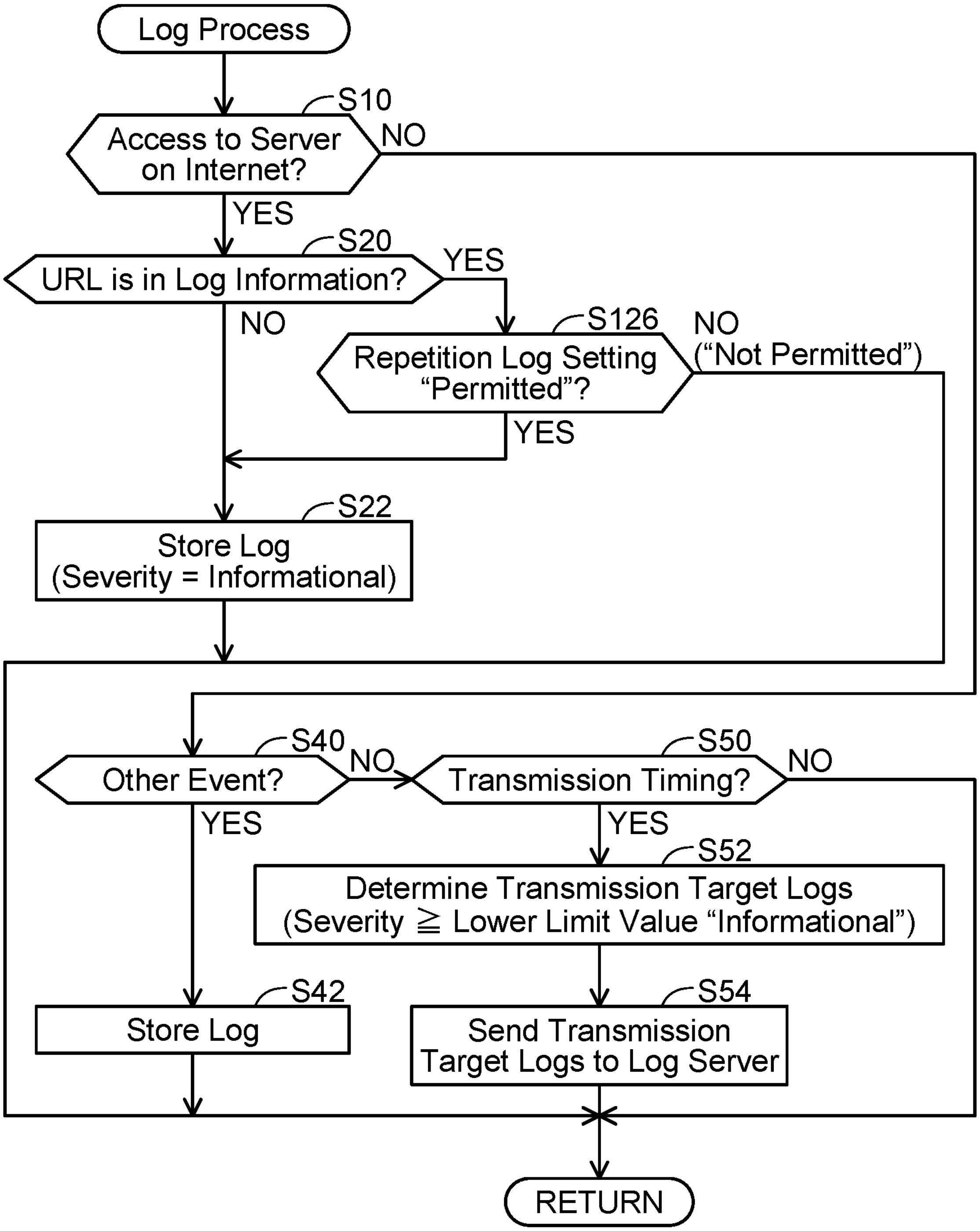
Figure 5:
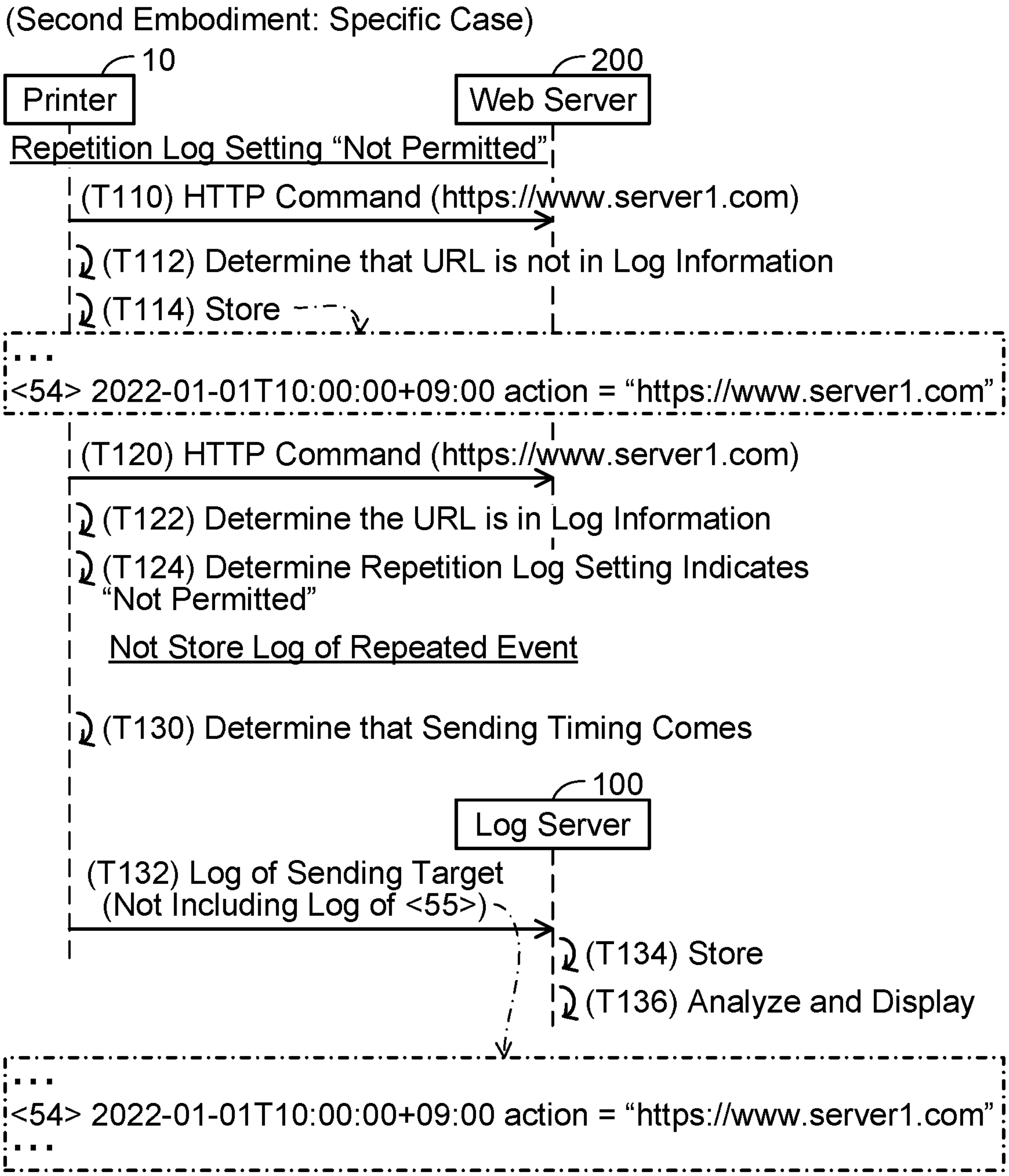
Figure 6:
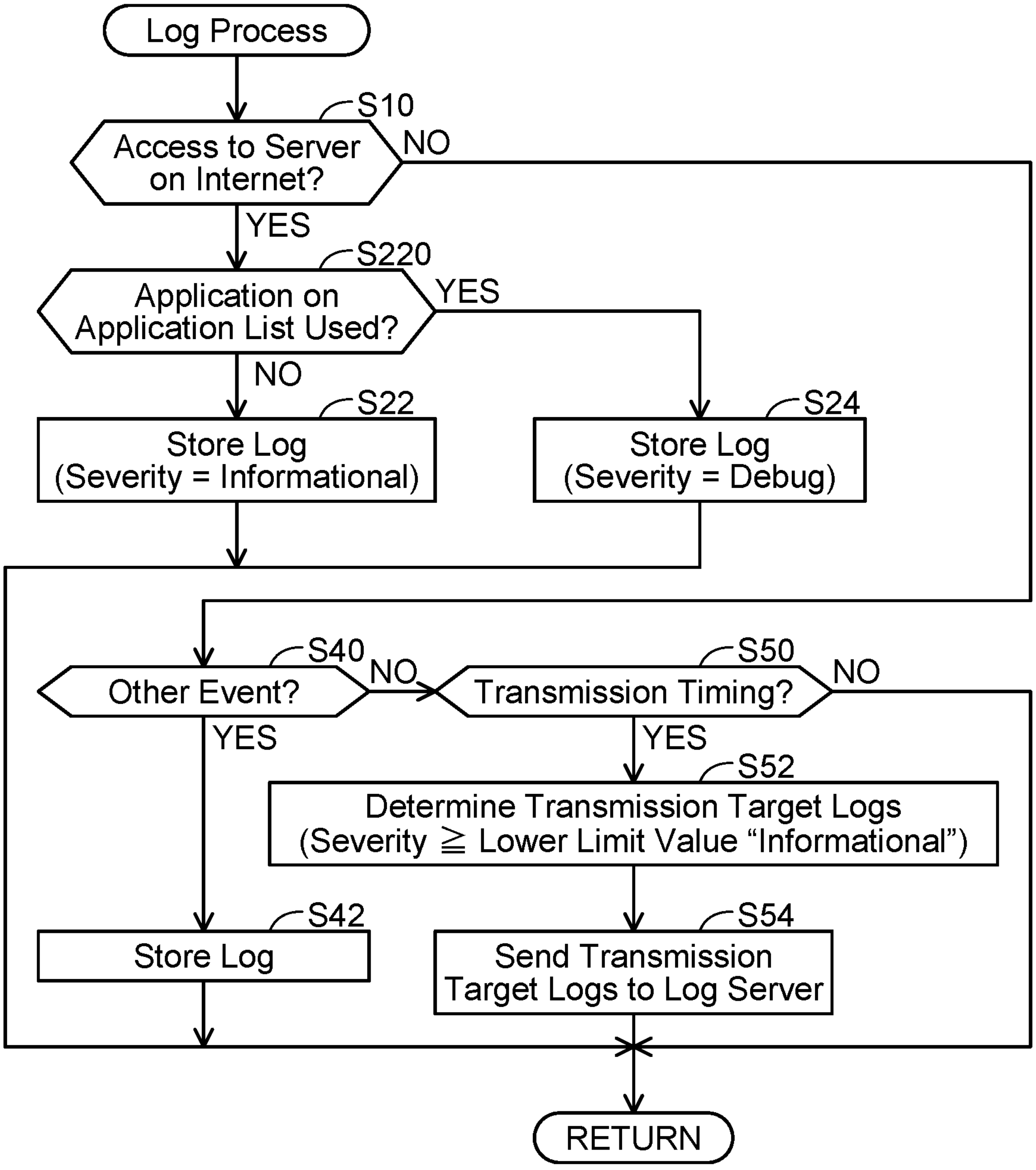
Figure 7:
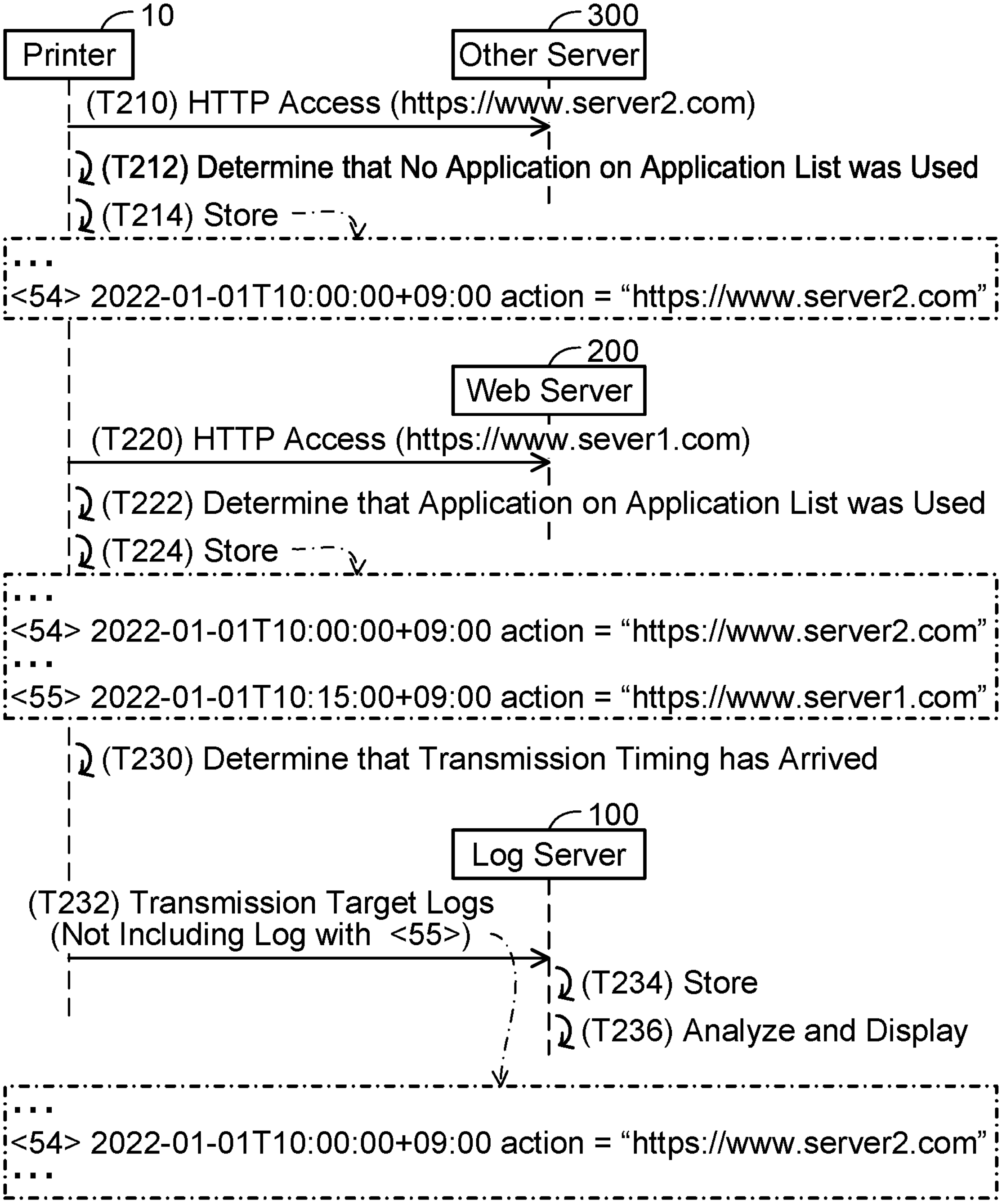

FIG. 1 shows a configuration of a communication system.
FIG. 2 shows a flowchart diagram of a log process.
FIG. 3 shows a sequence diagram for a specific case.
FIG. 4 shows a flowchart diagram of a log process.
FIG. 5 shows a sequence diagram for a specific case.
FIG. 6 shows a flowchart diagram of a log process.
FIG. 7 shows a sequence diagram for a specific case.

FIRST EMBODIMENT

Configuration of Communication System 2; FIG. 1

A communication system 2 comprises a printer 10, a log server 100, and a web server 200. The printer 10 and the log server 100 are connected to the same LAN (local area network) 4 and can communicate with each other via the LAN 4. The LAN 4 may be wired or wireless. The LAN 4 is connected to the Internet 6. The web server 200 is connected to the Internet 6. In a modification, the log server 100 may be connected to the Internet 6 instead of the LAN 4. Devices connected to the LAN 4 (e.g., the printer 10) can communicate with servers on the Internet 6 (e.g., the web server 200) via the LAN 4 and the Internet 6.

Configuration of Printer 10; FIG. 1

The printer 10 is a peripheral device (e.g., a peripheral device, such as a PC, in the LAN 4) configured to execute a print function. In a modification, the printer 10 may be a multifunctional device configured to execute a scan function, a FAX function, etc., in addition to the print function. The printer 10 comprises a LAN interface 12, a print executing unit 14, an operation unit 16, a display unit 18, and a controller 30. Hereinafter, interface will be abbreviated as "I/F".

The LAN I/F 12 is configured to execute communications via the LAN 4 and is connected to the LAN 4. The print executing unit 14 comprises a print mechanism of an inkjet scheme, a laser scheme, or the like. The operation unit 16 comprises a plurality of keys. A user can input various instructions to the printer 10 by operating the operation unit 16. The display unit 18 is a display for displaying various information. The display unit 18 may function as an operation unit such as a touch screen.

The controller 30 comprises a CPU 32 and a memory 34. The CPU 32 is configured to execute various processes according to a program 40 stored in the memory 34. In addition to the program 40, the memory 34 further stores log information 42 and a lower limit value 44.

The log information 42 indicates a list of logs of events that have occurred in the printer 10. The log information 42 is written according to the syslog protocol. The syslog protocol is a general-purpose communication protocol for storing system logs. Some logs in the log information 42 are sent to the log server 100, whereas logs in the log information 42 that have already been sent to the log server 100 before are not sent to the log server 100. The logs that have already been sent to the log server 100 before may or may not be deleted from the memory 34. Here, the events include, for example, a local communication via the LAN 4 (e.g., reception of print data), a predetermined operation performed on the operation unit 16 (e.g., change of settings of the printer 10), a communication via the Internet 6 (e.g., a communication with the web server 200), etc.

The number of logs in the log information 42 is preset by a vendor of printer 10. In a modification, the number of logs in the log information 42 may be determined by the user of the printer 10. When the number of logs in the log information 42 reaches a predetermined number, the printer 10 deletes the oldest log from the memory 34.

Each log includes a PRI section, a TIMESTAMP section, and an MSG section. The PRI section indicates a value (e.g., "54") calculated from a Facility value and a rank of Severity. The Facility value indicates the type of a system (e.g., printer system). Severity indicates the importance level of contents of the event. The smaller the rank number of Severity is, the higher the importance level is. For example, rank "0" is of higher level than rank "1", and rank "7" is of lower level than rank "6". Rank "7" is called "Debug", and rank "6" is called "Informational". The value in the PRI section is calculated, for example, by adding a rank number of Severity to an octuple value of the Facility value.

The TIMESTAMP section includes a character string (e.g., "2022-01-10T10:00:00+09:00") indicating the current date and time information (i.e., the date and time when the event occurred). The MSG section includes a character string indicating the content of the event. For example, if an event of accessing a server on the Internet 6 occurs, the MSG section includes the URL (Uniform Resource Locator) of the server.

The lower limit value 44 indicates the rank of a predetermined Severity. The lower limit value 44 indicates, for example, "Informational". Among the logs in the log information 42, logs with ranks as high as or higher than the rank indicated by the lower limit value 44 are sent to the log server 100. In other words, among the logs in the log information 42, logs with ranks lower than the rank indicated by the lower limit value 44 are not sent to the log server 100. The lower limit value 44 is settable by the user (e.g., administrator) of the printer 10.

Configuration of Log Server 100

The log server 100 manages logs received from the printer 10. When receiving logs from the printer 10, the log server 100 stores the logs. The administrator of the printer 10 is able to know the contents of the logs by accessing the log server 100.

Configuration of Web Server 200

The web server 200 provides a specific service to users. The specific service may be, for example, a cloud printing service, an automatic ordering service, a screen provision service, or the like. The cloud printing service is a service of generating print jobs in a data format that the printer 10 can interpret. The automatic ordering service is a service of automatically ordering consumable articles (e.g., ink cartridges) used in the printer 10. The screen provision service is a service of providing templates of screens to be displayed on touch screens. The specific service is not limited to the above services, but may be, for example, a storage service of storing scanned data.

For the cloud printing service, the printer 10 periodically transmits a polling signal to the web server 200 to check for the presence of a print job.

For the automatic ordering service, the printer 10 periodically transmits, to the Web server 200, information that indicates a remaining amount in a consumable article used in the printer 10. For the automatic ordering service, an always-on connection is established between the printer 10 and the web server 200. The always-on connection is an XMPP (Extensible Messaging and Presence Protocol) connection, a login session such as HTTPS (Hypertext Transfer Protocol Secure), or the like. The always-on connection remains established until the printer 10 is turned off. After the always-on connection is established, the printer 10 periodically transmits a keep-alive signal to the web server 200 to confirm that the always-on connection is maintained or to maintain the always-on connection.

For the screen provision service, the printer 10 transmits a request signal for requesting a template to the web server 200, according to an instruction input to the operation unit 16. The request signal is repeatedly sent each time an instruction is input to the operation unit 16.

Log Process; FIG. 2

Referring to FIG. 2, a log process executed by the CPU 32 according to the program is described. The process in FIG. 2 is triggered by the printer 10 being turned on. Each communication executed by the printer 10 is executed via the LAN I/F 12 and the LAN 4 (selectively further via the Internet 6). In the following description, unless otherwise mentioned, phrases "via the LAN I/F12", "via the LAN 4", and "via the Internet 6" are omitted.

The CPU 32 executes monitoring of S10, monitoring of S40, and monitoring of S50. In S10, the CPU 32 monitors whether an event of accessing a server (e.g., the web server 200) on the Internet 6 (hereinafter referred to as "target event") occurs. For example, the CPU 32 determines that a target event has occurred, in response to a command according to HTTP (hereinafter referred to as "HTTP command") being sent via the LAN I/F 12. The CPU 32 proceeds to S20 when a target event has occurred (YES in S10).

In S20, the CPU 32 determines whether a log that includes the URL of the server accessed in the target event (hereinafter referred to as "target URL") is included in the log information 42. When determining that the log including the target URL is not in the log information 42 (NO in S20), the CPU 32 proceeds to S22.

In S22, the CPU 32 stores a log of the target event to the memory 34 as the log information 42. The log stored in S22 includes a PRI section with Severity "Informational" and an MSG section including the target URL. In a modification, the Severity in S22 may be of a higher rank than "Informational". When S22 is completed, the CPU 32 returns to the monitoring of S10, etc.

When determining that the log including the target URL is in the log information 42 (YES in S20), the CPU 32 proceeds to S24. S24 is the same as S22, except that the PRI section is with Severity "Debug". The Severity in S24 may be any Severity as long as it is of a lower rank than the Severity in S22. When S24 is completed, the CPU 32 proceeds to S26.

In S26, the CPU 32 determines whether the access to the target URL has been repeated for the first time (i.e., whether this is the second access to the target URL). For example, the CPU 32 determines that the access to the target URL has been repeated for the first time when the number of target URLs included in the log information 42 is two. On the other hand, when the number of target URLs included in the log information 42 is three or more, the CPU 32 determines that the access to the target URL has been repeated twice or more times. When determining that the access to the target URL has been repeated for the first time (YES in S26), the CPU 32 proceeds to S28.

In S28, the CPU 32 stores a log that includes an MSG section including a notification message that notifies the log of the repeated accesses to the target URL has been stored in association with Severity "Debug", to the memory 34 as the log information 42. The Severity of the log stored in S28 is "Informational" which is the same as that of S22. The Severity in S28 may be any Severity as long as it is of a higher rank than the Severity in S24.

When S28 is completed or when it is determined that the access to the target URL has been repeated twice or more times (NO in S26), the CPU 32 returns to the monitoring of S10, etc.

In S40, the CPU 32 monitors whether an event other than the target event (e.g., local communication via the LAN 4) occurs. When another event occurs (YES in S40), the CPU 32 proceeds to S42.

In S42, the CPU 32 stores a log of the other event to the memory 34 as the log information 42. Severity of the other event is preassigned by the vendor of the printer 10. A list of Severities assigned to a plurality of events is stored in the memory 34. The CPU 32 identifies the Severity of the log stored in S42 using the list. When S42 is completed, the CPU 32 returns to the monitoring of S10, etc.

In S50, the CPU 32 monitors whether a timing to transmit a log in the log information 42 to the log server 100 has arrived. The transmission timing arrives, for example, in an hourly cycle. When the transmission timing has arrived (YES in S50), the CPU 32 proceeds to S52.

In S52, the CPU 32 determines one or more logs in the log information 42 that have Severities as high as or higher than the rank indicated by the lower limit value 44 as log(s) to be transmitted to the log server 100.

In subsequent S54, the CPU 32 transmits, to the log server 10, the one or more logs determined as logs to be transmitted. When S54 is completed, the CPU 32 returns to the monitoring of S10, etc.

Specific Case; FIG. 3

In the case shown in FIG. 3, the web server 200 provides the cloud printing service. In the preset case, a polling signal as a HTTP command is periodically transmitted to the web server 200.

In T10, the printer 10 transmits a polling signal as an HTTP command to the web server 200. This polling signal includes a URL "https://www.server1.com" of the web server 200. The polling signal transmission in T10 is the first polling signal transmission. At the time of T10, the log information 42 does not include a log that includes the URL of the web server 200.

Since the target even has occurred (YES in S10), the printer 10 executes S20 and onward in FIG. 2. In T12, the printer 10 determines that the URL of the web server 200 (i.e., target URL) is not included in the log information 42 (NO in S20). In T14, the printer 10 stores, as a log of the target event occurred in T10, a log that includes a PRI section "54" with Severity "Informational" and an MSG section including the target URL "https://www.server1.com" in the log information 42 (S22).

In T20, the printer 10 transmits again a polling signal as an HTTP command to the web server 200. The polling signal transmission in T20 is the second polling signal transmission. Since the target event has occurred (YES in S10), the printer 10 again executes S20 and onward in FIG. 2. In T22, the printer 10 determines that the target URL is included in the log information 42 (YES in S20). T24 is the same as T14 except that the value in the TIMESTAMP section is different and the PRI section includes "55" with Severity "Debug" (S24). By this point of time, a polling signal has been transmitted twice, and thus the number of target URLs included in the log information 42 is two. Therefore, in T26, the printer 10 determines that the access to the target URL has been repeated for the first time (i.e., this is the second access to the target URL) (YES in S26). T28 is the same as T14 except that the MSG section includes a notification message "server1.com is Debug" (S28).

In T30, the printer 10 determines that the transmission timing has arrived (YES in S50) and executes S52 and onward in FIG. 2. In the present case, the Severities of the logs stored in T14 and T28 (i.e., the first polling signal transmission and the notification message) are as high as or higher than the rank indicated by the lower limit value 44, which is set as "Informational". Therefore, in T32, the printer 10 determines the logs stored in T14 and T28 as logs to be transmitted (S52). Although not shown, the printer 10 also determines logs of other events as logs to be transmitted. The printer 10 then transmits the plurality of logs to be transmitted, including the logs stored in T14 and T28 and the logs of other events, to the log server 100 (S54). On the other hand, the Severity of the log stored in T24 (i.e., the second polling signal transmission) is lower than the rank indicated by the lower limit value 44. Therefore, in T32, the log stored in T24 is not transmitted to the log server 100.

In T34, the log server 100 stores the plurality of logs received from the printer 10. In subsequent T36, the log server 100 analyzes and displays the plurality of logs stored in the log server 100 according to instructions from the administrator of the printer 10. For example, the log server 100 displays a screen including all or a part of the logs stored in the log server 100. The log server 100 also visualizes values of logs stored in the log server 100 in a graph. The log server 100 also creates a report showing an analysis result of the logs stored in the log server 100 (e.g., occurrence frequency of each event).

Effects of Present Embodiment

Since a polling signal transmission (T10 and T20 in FIG. 3), which is the target event, occurs repeatedly, the number of occurrences of the target event is greater than the number of occurrences of other events. Logs are analyzed and displayed at the log server 100 (T36). If logs of the second and subsequent polling signal transmissions are transmitted to the log server 100, the load on the log server 100, which analyzes the logs, will be increased due to the large number of logs of the polling signal transmissions. In addition, if logs of the second and subsequent polling signal transmissions are transmitted to the log server 100, a small number of logs of other events may blend in the display of the large number of logs of polling signal transmissions, and the user may not notice the occurrences of other events.

According to the configuration of the present embodiment, the logs of other events are transmitted to the log server 100, whereas the logs of the second and subsequent polling signal transmissions are not transmitted to the log server 100. This can suppress the increased load on the log server 100, which analyzes the logs, caused by the influence of the many logs of the second and subsequent polling signal transmissions. It is also possible to prevent a small number of logs of the other events from blending in the display of the large number of logs of the second and subsequent polling signal transmissions.

Further, according to the configuration of the present embodiment, the log of the first polling signal transmission is stored with Severity "Informational" in the printer 10, and this log is transmitted to the log server 100 (T14 and T32 in FIG. 3). Thus, only the log of the first polling signal transmission out of the repeated polling signal transmissions can be analyzed and displayed by the log server 100.

Further, in the case shown in FIG. 3, the logs of the second and subsequent polling signal transmissions are not transmitted to the log server 100 due to the fact that the lower limit value 44 is set to "Informational". If the lower limit value 44 is set to "Debug", the logs of the second and subsequent polling signal transmissions will also be transmitted to the log server 100. The user can adjust whether the logs of the second and subsequent polling signal transmissions should be transmitted or not by adjusting the lower limit value 44.

Further, according to the configuration of the present embodiment, the log including the notification message is transmitted to the log server 100 (S28 in FIG. 2, T32 in FIG. 3). The administrator is able to know that the logs of the second or subsequent polling signal transmissions have been stored with Severity "Debug" in the printer 10 and these logs were not transmitted to the log server 100.

Correspondence Relationships

The printer 10, the LAN I/F 12, the operation unit 16, the memory 34, and the log information 42 are examples of "communication device", "communication interface", "operation unit", "memory", and "log information", respectively. The web server 200 is an example of "specific server". Polling signal transmission is an example of "predetermined communication". The other event and the first polling signal transmission are examples of "first-type event". The second and subsequent polling signal transmissions are examples of "second-type event". The target URL is an example of "specific location information". Severity "Informational" and Severity "Debug" are examples of "first importance level" and "second importance level", respectively. The lower limit value 44 is an example of "predetermined importance level". The notification message in S28 of FIG. 2 is an example of "message".

T10 and T20 in FIG. 3 are examples of "execute a predetermined communication with a specific server on the Internet". The process shown in FIG. 2 is an example of "execute a transmitting process".

SECOND EMBODIMENT

The present embodiment is the same as the first embodiment, except that the memory 34 stores a repetition log setting 50 and the log process is different.

Configuration of Printer; FIG. 1

The repetition log setting 50 selectively indicates one of "Permitted", which indicates that logs of the second and subsequent accesses to the web server 200 are permitted to be stored, and "Not Permitted", which indicates that logs of the second and subsequent accesses to the web server 200 are not permitted to be stored. The repetition log setting 50 is settable by the user. By setting the repetition log setting 50, the user can set whether or not to transmit logs of repeated events.

Log Process; FIG. 4

In a log process of the present embodiment, when determining that a log including the target URL is in the log information 42 (YES in S20), the CPU 32 proceeds to S126. In S126, the CPU 32 determines whether the repetition log setting 50 indicates "Permitted". When determining that the repetition log setting 50 indicates "Permitted" (YES in S126), the CPU 32 proceeds to S22 and stores the log. On the other hand, when determining that the repetition log setting 50 indicates "Not Permitted" (NO in S126), the CPU 32 does not store any log and returns to the monitoring S10, etc.

Specific Case; FIG. 5

In the case shown in FIG. 5, the web server 200 provides the cloud printing service, and the repetition log setting is set to "Not Permitted".

T110 to T120 are the same as T10 to T20 in FIG. 3. In T122, the printer 10 determines that the target URL "https://www.server1.com" is included in the log information 42 (YES in S20). In T124, the printer 10 determines that the repetition log setting indicates "Not Permitted" (NO in S126). Thus, the log of the second polling signal transmission is not stored in the memory 34.

T130 to T136 are the same as T30 to T36 in FIG. 3. In T132, the logs of the second and subsequent polling signal transmissions are not transmitted to the log server 100 due to the fact that the logs of the second and subsequent polling signal transmissions are not included in the log information 42.

In the present embodiment as well, as in the first embodiment, it is possible to suppress an increased load on the log server 100, and it is also possible to suppress a small number of logs of other events from blending in with the display of many logs of the second and subsequent polling signal transmissions. Further, it is also possible to suppress an increase in the information amount of the log information 42 in the memory 34 since the logs of the second and subsequent polling signal transmissions are not stored in the memory 34. The repetition log setting 50 is an example of "setting value".

THIRD EMBODIMENT

The present embodiment is the same as the first embodiment, except that the memory 34 stores an application list 52 and the log process is different.

Configuration of Printer 10; FIG. 1

For each of a plurality of services, the printer 10 stores an application program (not shown, hereinafter referred to as "app") for using the service. The application list 52 is a list of the apps. The plurality of apps on the application list 52 includes apps for using services that require repeated execution of a predetermined communication, such as the cloud printing service, the automatic ordering service, the screen provision service, the storage service, etc.

Log Process; FIG. 6

In a log process of the present embodiment, when the target event (i.e., access to a server on the Internet) occurs (YES in S10), the CPU 32 proceeds to S220. In S220, the CPU 32 determines whether an app on the application list 52 was used in the target event. When determining that no app on the application list 52 was used in the target event (NO in S220), the CPU 32 proceeds to S22 and stores the log with Severity "Informational". On the other hand, when determining that an app on the application list 52 was used in the target event (YES in S220), the CPU 32 proceeds to S24 and stores the log with Severity "Debug".

Specific Case; FIG. 7

In the case shown in FIG. 7, the printer 10 accesses not only the web server 200 that provides the cloud printing service, but also another server 300. The other server 300 is a server that the printer 10 can access without using an app on the application list 52, for example, an electronic commerce site.

In T210, the printer 10 transmits an HTTP command to the other server 300. Since the target event has occurred (YES in S10), the printer 10 executes S220 and onward in FIG. 6. In T212, the printer 10 determines that no app on the application list 52 was used (NO in S220). In T214, the printer 10 stores, as a log of the target event in T210, a log that includes a PRI section including "54" with Severity "Informational" and an MSG section including the URL "https://www.server2.com" of the other server 300 in the log information 42 (S22).

In T220, the printer 10 transmits a polling signal including the URL of the web server 200 to the web server 200 as an HTTP command. The polling signal transmission in T220 is the first, second, or subsequent polling signal transmission.

Since the target event has occurred (YES in S10), the printer 10 executes again S220 and onward in FIG. 6. In T222, the printer 10 determines that an app on the application list 52 was used (YES in S220). In T224, the printer 10 stores, as a log of the target event in T220, a log that includes a PRI section including "55" with Severity "Debug" and an MSG section including the URL "https://www.server1.com" of the web server 200 in the log information 42 (S24).

T230 to T236 are the same as T30 to T36 in FIG. 3. In the present embodiment, unlike the first embodiment, both the log of the first polling signal transmission and the logs of the second and subsequent polling signal transmissions are not transmitted to the log server 100.

In the present embodiment as well, as in the first embodiment, it is possible to suppress an increased load on the log server 100, and it is also possible to suppress a small number of other events from blending in the display of many logs of polling signal transmissions. The application list 52 is an example of "list". Every communication for using the cloud printing service is an example of "second-type event (and specific event)".

Modification of Third Embodiment

After determining YES in S220, the CPU 32 may determine whether the target event in S10 is a specific communication among plural types of communications executed by the apps. The specific communication is, for example, a polling signal transmission. When determining that the target event in S10 is the specific communication, the CPU 32 may proceed to S24, whereas when determining that the target event in S10 is other than the specific communication, the CPU 32 may proceed to S22. In this modification, for example, among communications for using the cloud printing service, a log of polling signal transmission is stored with Severity "Debug". On the other hand, among the communications for using the cloud printing service, a log of communication other than polling signal transmission (e.g., a log of receipt of a print job) is stored with Severity "Informational". That is, the log of communication other than the polling signal transmission is transmitted to the log server 100. In this modification, the communication other than the polling signal transmission and the polling signal transmission are examples of "first-type event" and "second-type event (and specific event)", respectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Modification 1

The "second-type event" is not limited to a part of communication (e.g., polling signal transmission) for a web service that requires repeated communication (e.g., the cloud printing service, the automatic ordering service, the screen provision service, the storage service, the electronic commerce site, etc.), but may be the entire communication for the service. Generally speaking, the "second-type event" may be any communication as long as it is a predetermined communication that is repeatedly executed per unit of time with a specific server on the Internet.

Modification 2

The "communication device" is not limited to the printer 10, but may be another peripheral device, a desktop PC, a notebook PC, a smart phone, a server, or the like.

Modification 3

The "specific location information" is not limited to the entire URL, but may be a part of a URL (e.g., domain name).

Modification 4

The memory 34 may not store the lower limit value 44. In this modification, the "predetermined importance level" may be omitted.

Modification 5

The determination in S126 of FIG. 4 using the repetition log setting 50, which is an example of the "setting value", may be employed in the first and third embodiments.

Modification 6

S28 in FIG. 3 in which the notification message, which is an example of the "message", is stored may be employed in the second and third embodiments. For example, in case of it being employed in the second embodiment, the notification message may be a message indicating that the log of repeated access to the target URL has not been stored in the printer 10.

Modification 7

In the above embodiments, each of the processes in FIGS. 2 to 7 is implemented by software (e.g., the program 40), but at least one of these processes may be implemented by hardware such as a logic circuit.

What is claimed is:

1. A communication device, comprising:

a communication interface for communication with a server on the Internet;

a memory storing log information and a predetermined importance level settable by a user, the log information comprising a list of logs of events, wherein each event is a communication with the server on the Internet via the communication interface occurring in the communication device, the logs being different types of logs and the events being different types of events; and a controller, wherein the controller is configured to:

repeatedly transmit a specific signal to a specific server on the Internet via the communication interface;

in a case where the specific signal is transmitted first, store a first-type log to the log information in the memory, the first-type log including a specific URL indicating a location of the specific server on the Internet and a first value indicating a first importance level higher than or equal to the predetermined importance level;

in a case where the specific signal is transmitted second, store a second-type log and a third-type log to the log information in the memory, the second-type log including the specific URL and a second value indicating a second importance level lower than the predetermined importance level the third-type log including a message and a third value indicating a third importance level higher than or equal to the predetermined importance level, and the message notifying that the second-type log is stored in the log information;

in a case where the specific signal is transmitted third, store the second-type log to the log information in the memory, wherein in the case where the specific signal is transmitted third, the third-type log is not stored to the log information;

execute a transmitting process for transmitting, to an external device different from the communication device, a log included in the log information stored in the memory, wherein in the transmitting process, the first-type log in the log information is transmitted to the external device due to the first value included in the first-type log, the third-type log in the log information is transmitted to the external device due to the third value included in the third-type log, and in the transmitting process, the second type log in the log information is not transmitted to the external device due to the second value included in the second-type log.

2. The communication device according to claim 1, wherein the specific signal is a keep-alive signal or a polling signal.

3. The communication device according to claim 1, wherein the memory further stores a setting value that indicates either one of a first setting value indicating that transmission of the second-type log is permitted and a second setting value indicating that transmission of the second-type log is not permitted, in a case where the setting value indicates the first setting value, the second-type log is transmitted to the external device in the transmitting process, and in a case where the setting value indicates the second setting value, the second-type log is not transmitted to the external device in the transmitting process.

4. A non-transitory computer-readable recording medium storing computer-readable instructions for a communication device, wherein the communication device comprises:

a communication interface for communication with a server on the Internet;

a memory storing log information and a predetermined importance level settable by a user, the log information comprising a list of logs of events, wherein each event is a communication with the server on the Internet via the communication interface occurring in the communication device, the logs being different types of logs and the events being different types of events; and a processor, wherein the computer-readable instructions, when executed by the processor, cause the communication device to:

repeatedly transmit a specific signal to a specific server on the Internet via the communication interface;

in a case where the specific signal is transmitted first, store a first-type log to the log information in the memory, the first-type log including a specific URL indicating a location of the specific server on the Internet and a first value indicating a first importance level higher than or equal to the predetermined importance level;

in a case where the specific signal is transmitted second, store a second-type log and a third-type log to the log information in the memory, the second-type log including the specific URL and a second value indicating a second importance level lower than the predetermined importance level the third-type log including a message and a third value indicating a third importance level higher than or equal to the predetermined importance level, the message notifying that the second-type log is stored in the log information;

in a case where the specific signal is transmitted third, store the second-type log to the log information in the memory, wherein in the case where the specific signal is transmitted third, the third-type log is not stored to the log information; and execute a transmitting process for transmitting, to an external device different from the communication device, a log included in the log information stored in the memory, wherein in the transmitting process, the first-type log in the log information is transmitted to the external device due to the first value included in the first-type log, the third-type log in the log information is transmitted to the external device due to the third value included in the third-type log, and in the transmitting process, the second type log in the log information is not transmitted to the external device due to the second value included in the second-type log.

5. A control method for a communication device, wherein the communication device comprises:

a communication interface for communication with a server on the Internet; and a memory storing log information and a predetermined importance level settable by a user, the log information comprising a list of logs of events, wherein each event is a communication with the server on the Internet via the communication interface occurring in the communication device, the logs being different types of logs and the events being different types of events; wherein the control method comprises:

repeatedly transmit a specific signal to a specific server on the Internet via the communication interface;

in a case where the specific signal is transmitted first, store a first-type log to the log information in the memory, the first-type log including a specific URL indicating a location of the specific server on the Internet and a first value indicating a first importance level higher than or equal to the predetermined importance level;

in a case where the specific signal is transmitted second, store a second-type log and a third-type log to the log information in the memory, the second-type log including the specific URL and a second value indicating a second importance level lower than the predetermined importance level the third-type log including a message and a third value indicating a third importance level higher than or equal to the predetermined importance level, the message notifying that the second-type log is stored in the log information;

in a case where the specific signal is transmitted third, store the second-type log to the log information in the memory, wherein in the case where the specific signal is transmitted third, the third-type log is not stored to the log information; and execute a transmitting process for transmitting, to an external device different from the communication device, a log included in the log information stored in the memory, wherein in the transmitting process, the first-type log in the log information is transmitted to the external device due to the first value included in the first-type log, the third-type log in the log information is transmitted to the external device due to the third value included in the third-type log, and in the transmitting process, the second type log in the log information is not transmitted to the external device due to the second value included in the second-type log.

* * * * *